United States Patent

Mitchell

[15] 3,639,901

[45] Feb. 1, 1972

[54] ERROR CORRECTING DECODER UTILIZING ESTIMATOR FUNCTIONS AND DECISION CIRCUIT FOR BIT-BY-BIT DECODING

[72] Inventor: Michael E. Mitchell, Syracuse, N.Y.

[73] Assignee: General Electric Company

[22] Filed: June 10, 1969

[21] Appl. No.: 831,860

[52] U.S. Cl. ..........340/146.1, 307/211

[51] Int. Cl. ..........H04l 1/10, H03k 19/42

[58] Field of Search ..........307/211; 340/146.1

[56] References Cited

UNITED STATES PATENTS 3,402,393 9/1968 Massey ..........340/146.1 X 3,469,236 9/1969 Gallager ..........340/146.1

*Primary Examiner*—Malcolm A. Morrison
*Assistant Examiner*—R. Stephen Dildine, Jr.
*Attorney*—Norman C. Fulmer, Carl W. Baker, Frank L. Neuhauser, Oscar B. Waddell and Joseph B. Forman

[57] ABSTRACT

An error-correcting decoder circuit is disclosed, for decoding redundantly coded digital signals. The disclosed circuit includes a plurality of modulo 2 adders for generating estimator function bits from selected bits of a received code word, and a decision circuit that generates an output bit in accordance with the majority of the estimator functions if a majority decision is possible, and which substitutes the appropriate received bit in place of the undefined majority decision output that arises in the event of a "tie" between the estimator functions (i.e., when half of the estimator functions are "1" and the other half are "0").

5 Claims, 4 Drawing Figures

INVENTOR:
MICHAEL E. MITCHELL,
BY Norman C. Fulmer
HIS ATTORNEY.

INVENTOR:
MICHAEL E. MITCHELL,

BY Norman C. Fulmer
HIS ATTORNEY.

ERROR CORRECTING DECODER UTILIZING ESTIMATOR FUNCTIONS AND DECISION CIRCUIT FOR BIT-BY-BIT DECODING

BACKGROUND OF THE INVENTION

The invention is in the field of electronic systems for the transmission of information in the form of coded digital signals. The invention is particularly directed to error-correcting decoder circuits for decoding redundantly coded signals representing information such as computer data, telemetry information (for rockets and space stations, for example), stock market quotations, airline reservations, and other business and scientific data.

A frequently used technique for transmitting information, is to convert the information into a binary form consisting of "1" bits and "0" bits. These bits are frequently grouped into binary data words representing the elemental units of data to be transmitted. The type of coded information transmission system to which the invention best applies, employs an encoder at the transmitter which generates a number of extra (redundant) bits to be associated with each binary data word to form a code word for transmission, and employs a decoder at the receiver which decodes the received coded signals to recover the data words. Numerous error-correcting codes have been devised, having the general characteristic of adding redundant bits to the data words according to systematic rules so as to form code words such that, if during transmission a limited number of the bits in a code word becomes altered or obliterated due to static, noise, fading or other causes, the received code word will nonetheless differ from any other code word in a sufficient number of bits so that the decoder will be able to properly decode it into the correct binary data word.

One type of error-correcting system, described in U.S. Pat. No. 3,237,160 to Michael E. Mitchell and assigned to the same assignee as the present invention, employs a decoder at the receiver which functions to compare each incoming word with a code word vocabulary. By the process of correlation, the correct (or most likely correct) binary data word is selected and fed out of the decoder.

Another general type of error-correcting system, to which the present invention belongs, is described in U.S. Pat. Nos. 3,164,804 and 3,222,644 to Burton and Mitchell and assigned to the same assignee as the present invention. In this type of system, each received binary word is sequentially fed into a register, and "estimator" logic circuits generate output signal bits (estimators) in accordance with the contents of certain stages of the register. A majority logic circuit provides an output bit in accordance with the majority of the estimators. The register is then shifted one step and the foregoing sequence repeated, and so on, whereby the decoded data-word bits are obtained and fed out from the decoder.

In decoder circuits in which an even number of estimator bits is fed to a majority logic circuit, there will be a "tie," and hence a meaningless result, whenever half of the estimators are "1" bits and the other half are "0" bits. The same result will occur when an odd number of estimators is employed, if one (or any odd number) of the estimators has been "erased" on the basis of received bit null zone detection results or other indications of estimator unreliability, and of the remaining estimators, half are "1" bits and the other half are "0" bits. A prior art method for resolving this difficulty is to break the tie arbitrarily by modifying the majority logic circuit so that it will generate a "1" bit in the event of a tie (or, alternatively, a "0" bit). This prior art method of breaking a tie results in only a 50 percent chance of generating the correct data bit, which is far below the high accuracy (greater than 99 percent) usually achieved when the majority decoding decision is possible. Therefore a need has existed for improving decoder circuitry to increase the accuracy of generating a data output bit in the event of a tie in the values of the estimator bits.

SUMMARY OF THE INVENTION

Objects of the invention are to provide an improved error-correcting decoder, and to provide such a decoder with means having increased accuracy for breaking a tie in the bit-estimator functions.

The invention comprises, briefly and in a preferred embodiment an error-correction decoder circuit for decoding digital coded signals of the type comprising data bits accompanied by redundant bits for error correction purposes. The decoder circuit generates a plurality of bit-estimator functions, in well-known manner, which are fed to a threshold decision circuit for sequential determination of the most likely correct transmitted code bits. In accordance with the invention, a switching circuit is connected with the threshold decision circuit and functions, in the event of a tie of bit estimators (and hence no output or meaningless output from the threshold decision circuit), to feed out the uncorrected received bit in place of the meaningless or arbitrary bit output of the threshold decision circuit.

DESCRIPTION OF THE PREFERRED EMBODIMENT

Figures 1, 2:
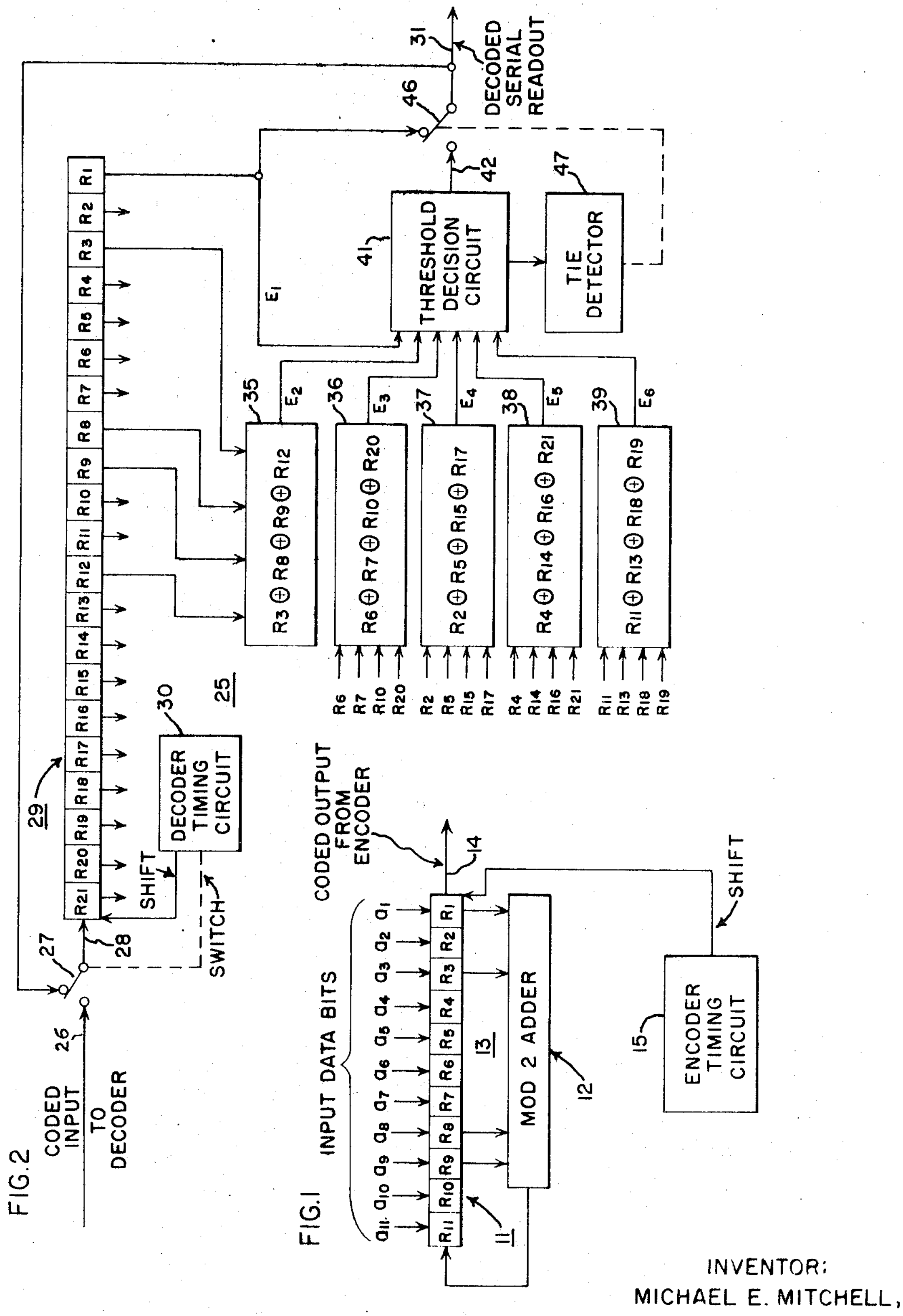
FIG. 1 is an electrical block diagram of an encoder for use with a preferred embodiment of the invention.
FIG. 2 is an electrical block diagram of a decoder in accordance with a preferred embodiment of the invention.

In the encoder circuit of FIG. 1, a plurality of binary data bits $a_1$ through $a_{11}$ are respectively applied to stages $R_1$ through $R_{11}$ of a shift register 11. The contents of stages of $R_1$, $R_3$, $R_8$, and $R_9$ are fed to a modulo 2 adder 12, the output of which is fed into stage $R_{11}$ of the shift register 11. The input data bits $a_1$ through $a_{11}$ each constitutes a binary "1" or "0," in standard binary parlance. The mod 2 adder 12 provides the mod 2 sum of the binary inputs. As is well known, mod 2 addition is the same as binary addition except that carries are ignored. The symbol for mod 2 addition is $\oplus$ and the possible summations of the various combinations of binary inputs are as follows:

$$0 \oplus 0 = 0$$
$$1 \oplus 1 = 0$$
$$0 \oplus 1 = 1$$
$$1 \oplus 0 = 1$$

The arrangement of the shift register 11 and mod 2 adder 12 comprises an encoder 13 that can produce, at the output 14 of the shift register 11, any word of the (21, 11) code, consisting of 21 bits per coded word, of which the first 11 bits are data bits and the remaining 10 bits are redundant bits added for coding purposes. The shift register 11 is sequentially shifted toward the right under control of a timing circuit 15, a step at a time, to produce the aforesaid coded output at 14. The aforesaid U.S. Pat. No. 3,222,644 shows and describes in more detail an arrangement for producing any word of the (15, 7) code. The code words comprising various other codes can be similarly produced. The coded output at 14 is transmitted by suitable means, such as radio waves or telephone wires, to a receiver which includes a decoder.

In the circuit of FIG. 2, the signal received from the circuit of FIG. 1 is fed, after detection and amplification if required, to a decoder circuit 25 via a connection 26. An electronic switch 27 is arranged to temporarily connect the input connection 26 to the input 28 of a 21-stage shift register 29, whereupon the 21 stages of shift register 29 become loaded with the 21 bits of a received code word. The switch 27 then connects the shift register input 28 to the output 31 of the decoder, to provide a feedback loop for sequentially shifting the received word bits from the decoder output to the input of the shift register 29.

Figure 3:
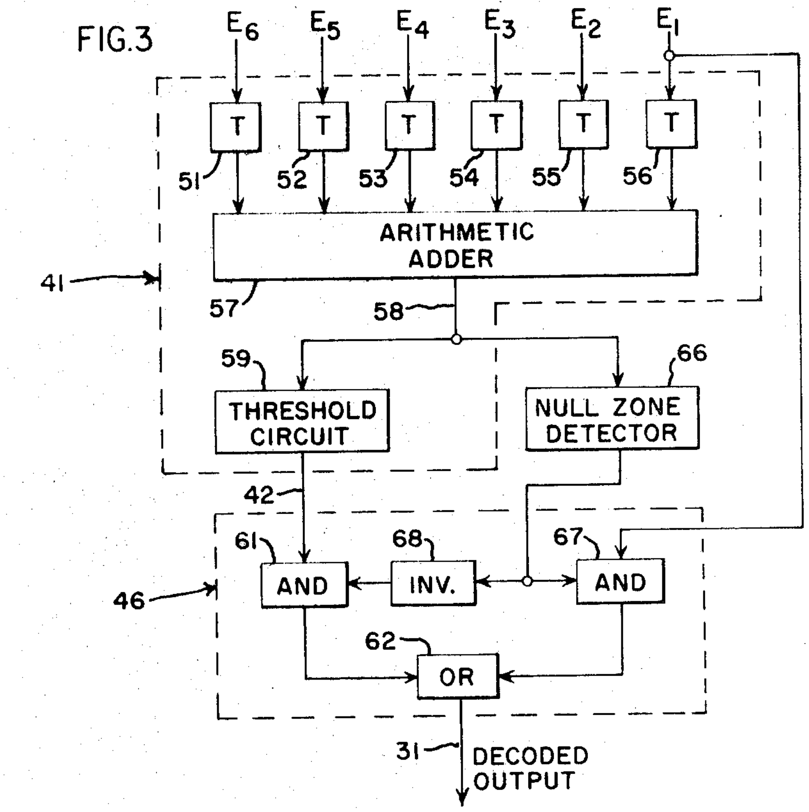
FIGS. 3 and 4 are detailed functional diagrams showing alternative embodiments of the invention.
Figure 4:
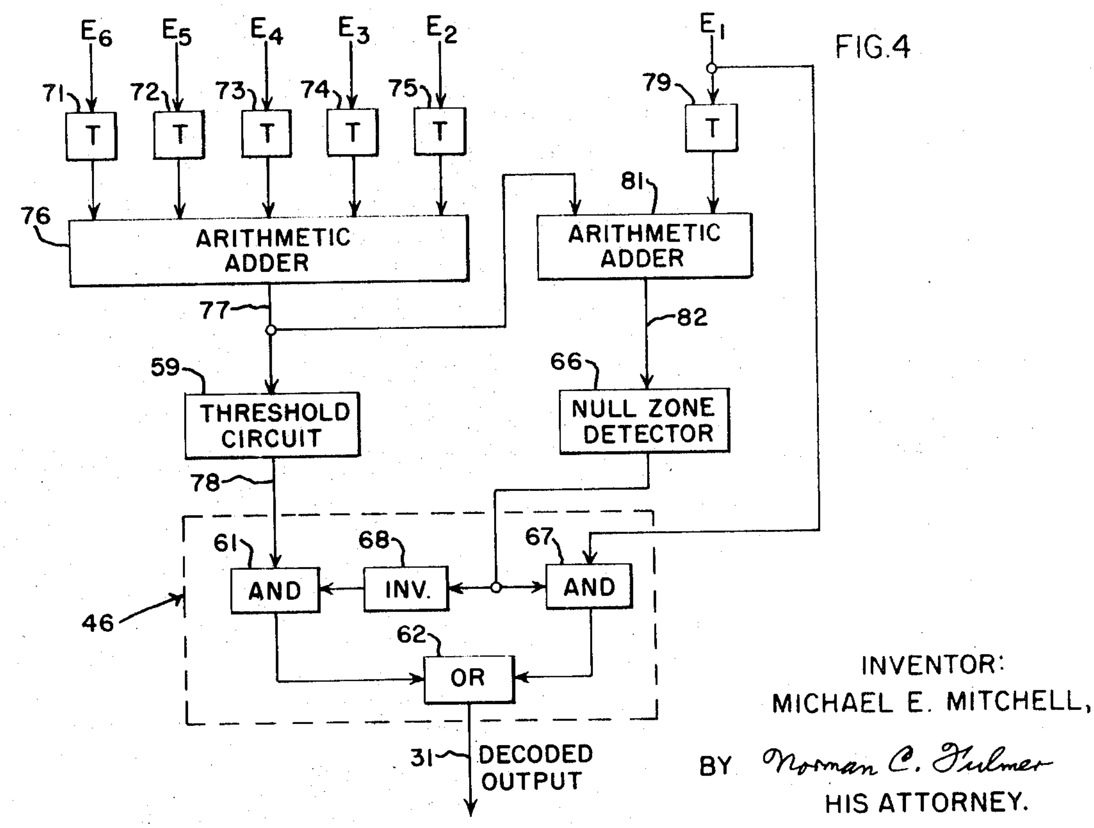

Five modulo 2 adder circuits 35, 36, 37, 38, and 39 are provided. Four different stages of the shift register 29 are connected to each of the modulo 2 adders 35–39, as shown in FIG. 2. The outputs of the five modulo 2 adders 35–39, and also the contents of stage $R_1$ of the shift register 29, are connected to inputs of a threshold decision circuit 41, which may include a majority logic circuit, the output 42 of which is a sequential readout of the decoded binary data word bits which, in the example shown, is 11 bits per data word. If one or two of the input bits to the decision circuit 41 are erroneous, due to interference or for other reasons, the decision circuit will, on the basis of the remaining four correct input bits, provide the correct output bit. FIGS. 3 and 4 show the decision circuit 41 in more detail. After each threshold circuit decision, the shift register 29 is shifted one stage, and the procedure is repeated. After a received code word has been decoded and the decoded data word has been read out at 42 the input switch 27 functions to load another received code word into the shift register 29, and so on. The aforesaid switching and shifting is controlled by a decoder timing circuit 30.

In accordance with a feature of the invention, an electronic switch 46 is connected between the decoder output 31 and the threshold decision circuit output 42, and is adapted to switch the decoder output 31 alternatively to the decision circuit output 42 or to the stage $R_1$ of shift register 29. The switch 46 is controlled by a tie detector circuit 47 which is connected to the decision circuit 41. The switch 46 normally connects the decoder output 31 to the decision circuit output 42. As explained above, if at least four of the six input estimator bits $E_1$ through $E_6$ are correct, the correct data bit will be read out of the decision circuit output 42 and hence out of the decoder output 31. However, if half of the decision circuit inputs are 1's and half are 0's the decision circuit input will be a tie and hence its output will be meaningless; or, if desired, the circuit can be designed to arbitrarily break a tie in favor of a "1" or a "0" in which event the chance of being correct is only 50 percent (provided that the transmitted bit which resulted in the received bit in $R_1$ was a "0" or "1" with probability ½).

In accordance with the invention, the tie detector 47 detects a tie and actuates switch 46, whereby the $E_1$ data bit from shift register stage $R_1$ is read out from decoder output 31, which improves the chance of being correct from 50 percent up to the probability of correctly receiving the bit in stage $R_1$, which usually exceeds 99 percent. The foregoing will be better understood by realizing that stage $R_1$ of the shift register 29 always contains the received bit being decoded at a particular instant, this bit being subject to error due to static, fading, etc. This is because the connections of the modulo 2 adder 12 to shift register 11 of the encoder at the transmitter, and the connections of the modulo 2 adders 35–39 to the shift register 29 at the decoder, are such that the estimator bits $E_2$–$E_6$ will always be the same as the $E_1$ data bit in shift register stage $R_1$ in the absence of any errors in transmission. It follows that the decoder output 31 will always be correct if the received word contains no more than two errors, and will sometimes be correct when the received word contains more than two errors. For example, if the received word contains errors in bits 1, 3, and 12, the decoder output 31 will be correct for any shift of the contents of shift register 29. Numerous other patterns of more than two errors can also be corrected.

FIG. 3 shows an arrangement of circuitry for the threshold decision circuit 41, switch 46, and tie detector 47. The estimator bits $E_1$ through $E_6$ are respectively fed through translators 51 through 56 which translate the "1" and "0" estimator bits into pulses of respectively opposite polarity with respect to zero. For example, "1" estimator bits are translated into positive polarity voltage pulses and "0" estimator bits are translated into negative polarity voltage pulses. These translated positive and negative pulses are fed into an arithmetic adder 57 the output of which is a positive polarity pulse if the majority of the input pulses is positive, and is a negative polarity pulse if the majority of the input pulses is negative. The magnitude of this pulse is proportional to the "plurality" of the majority of the estimates. This translation process increases the accuracy of the addition and further processing, as compared to arrangements which add and process the normal unipolar "0" and "1" bit signals directly. The translator outputs may consist of bipolar signal levels instead of bipolar pulses. Arithmetic adder 57 may take either a digital or analog form. The translator circuits are desirable but are not absolutely required elements of the invention.

The output 58 of the adder 57 is fed through a threshold circuit 59 which translates the positive or negative sum back to a "1" or a "0," respectively, the signal output 42 thereof being the same as the output 42 of the threshold decision circuit 41 in FIG. 2. The output 42 of threshold circuit 59 is fed into an AND-circuit 61, the output of which is fed into an OR-circuit 62, the output 31 of which is the same output 31 of the decoder as in FIG. 1. The output 58 of the adder 57 is also applied to a null zone detector 66, the output of which is applied to an input of an AND-circuit 67 and also, through an inverter 68, to the remaining input of the AND-circuit 61. The signal bit $E_1$, from stage $R_1$ of shift register 29, is applied to the remaining input of the AND-circuit 67, the output thereof being applied to the remaining input of the OR-circuit 62.

The output signal of the null zone detector 66 is normally a "0" which is inverted by the inverter 68 and applied as a "1" to an input of the AND-circuit 61, whereby in normal operation all "1" bits at 42 pass through the AND-circuit 61 and through the OR-circuit 62 to the decoder output 31, and whereby "0" bits at 42 result in "0" bits at the decoder output 31. The null zone detector 66 produces a "1" output whenever the output 58 of adder 57 is zero, or is in a zone so close to zero as to be unreliable. Such a zone is, for example, the zone between plus V and minus V if the "1" and "0" outputs from translator circuits 51–56 are respectively equal to +V and −V. When the null zone detector output is thus a "1," the inverter 68 applies a "0" to the AND-circuit 61 whereby the signal at 42 cannot reach the decoder output 31. At the same time, the "1" output of the null zone detector 66 enables the AND-circuit 67 whereby the data bit content of register stage $R_1$ is fed, through AND-circuit 67 and OR-circuit 62, to the decoder output 31 in lieu of the meaningless "tie" estimated majority output of the threshold circuit 59. This considerably increases the decoder accuracy in the event of such a "tie," typically from 50 percent to more than 99 percent as described above with respect to FIG. 1. In FIG. 3, as compared with FIG. 1, the translators 51 through 56, adder 57, and threshold circuit 59 constitute the threshold decision circuit 41; the null zone detector 66 constitutes the tie detector 47; and the logic circuits 61, 62, 67, and 68 constitute the switch 46.

In the alternative embodiment of FIG. 4, the five estimator bits $E_2$ through $E_6$ are fed through translators 71 through 75, which function to translate the "1" and "0" estimator bits into positive and negative signal pulses (or levels) to inputs of an arithmetic adder 76, the output 77 of which is applied to a threshold circuit 59 which produces at its output 78 a "1" or "0" signal based on the majority of the five estimator bits $E_2$ through $E_6$ in a manner similar to that described with respect to FIG. 3 for the six estimator bits $E_1$ through $E_6$. This output 78 is applied to an AND-circuit 61 of switch 46, the same as in FIG. 3. The $E_1$ data bit from stage $R_1$ of the shift register 29 is applied, via a translator 79, to an input of an arithmetic adder 81, another input thereto being connected from the output 77 of adder 76. The output 82 of the adder 81 is applied to a null zone detector 66 which is the same as that in FIG. 3, the output of which is fed to the AND-circuit 67 of the switch 46.

The circuit of FIG. 4 functions to provide an overall result the same as that of the circuit of FIG. 3. As explained above, the output 78 of threshold circuit 59 is a "1" or "0," in accordance with the majority of the five estimator bits $E_2$ through $E_6$. The output 82 of adder 81, and the functioning of the null zone detector 66, depends on the arithmetic combination of the output of translator 79 derived from $E_1$ and the sum output 77 derived from $E_2$ through $E_6$. For example, if the sum signal at 77 is at the plus 1 level and the $E_1$ bit as translated by translator 79 is at the minus 1 level, the output 82 of adder 81 will be in the zero or null zone (a tie of the estimator bits) and the null zone detector 66 will generate a "1" bit which will turn OFF the AND-gate 61 and turn ON the AND-gate 67, thereby feeding the $E_1$ bit from register stage $R_1$ to the decoder output 31 in lieu of the majority bit from the output of threshold circuit 59, the same as described above with respect to FIG. 3. When the estimator bit values $E_1$ through $E_6$ do not produce a tie, the majority estimator bit at output 78 of threshold circuit 59 is the same as would be generated by the output 42 of threshold circuit 59 in FIG. 3, and is fed to the decoder output 31.

Although the circuits of FIGS. 3 and 4 are equivalent as to overall function, for some applications the single relatively large adder 57 of FIG. 3 will be preferred, while the use of the two relatively smaller adders 76 and 81 of FIG. 4 will be preferred in other applications of the invention.

As described above, the invention achieves the objective of greatly increasing the accuracy of decoding a data bit in the event of a "tie" or meaningless input to a threshold decision circuit in a bit-by-bit type of decoder for a redundantly coded error correction transmission system.

While preferred embodiments of the invention have been shown and described, various other embodiments and modifications thereof will become apparent to persons skilled in the art, and will fall within the scope of the invention as defined in the following claims.

What I claim is:

1. An error-correcting decoder circuit for decoding a received coded word made up of data bits and redundant bits, comprising storage means for storing the bits of said code word, means connected to said storage means and adapted to generate a plurality of estimator bits from selected bits of said coded word, said estimator bits being indicative of a certain one of said code bits, a decision circuit connected to receive said estimator bits and adapted to produce at the output thereof an output bit indicative of the majority of said estimator bits, said decision circuit being subject to having a meaningless output due to lack of a majority of said estimator bits, wherein the improvement comprises a tie detector circuit connected to said decision circuit and adapted to detect a lack of majority of said estimator bits, an output terminal for said decoder circuit, and switch means controlled by said tie detector circuit and adapted to connect said output terminal to said output of the decision circuit when majority output bits are being produced thereby, said switch means being further adapted under the control of said tie detector to connect said output terminal to said storage means for feeding said certain one of the data bits to said output terminal whenever said tie detector detects a lack of majority of said estimator bits.

2. A circuit as claimed in claim 1, in which said decision circuit comprises a plurality of translators respectively adapted to translate said estimator bits into positive polarity and negative polarity pulses or levels indicative of "1" and "0" estimator bits, an arithmetic adder connected to receive said positive and negative polarity pulses or levels and adapted to produce the arithmetic sum thereof, and a threshold circuit connected to the output of said arithmetic adder and adapted to produce said output bit indicative of the majority of said estimator bits, and in which said tie detector circuit comprises a null zone detector connected to receive said arithmetic sum from said arithmetic adder and adapted to produce a switch control signal in the event that the output of said arithmetic adder indicates less than a majority of said estimator bits, and means connecting said switch means to receive said switch control signal so as to be actuated thereby.

3. A circuit as claimed in claim 2, in which said switch means comprises a first AND circuit having an input connected to the output of said threshold circuit, an inverter circuit connected between the output of said null zone detector and another input of said first AND circuit, a second AND circuit having an input connected to said output of the null zone detector and having another input connected to said output of the null zone detector and having another input connected to receive said certain one of the data bits, and an OR circuit having inputs respectively connected to the outputs of said first and second AND circuits and an output connected to said decoder output terminal.

4. A circuit as claimed in claim 1, in which said estimator bits include said certain one of the code bits, and in which said decision circuit comprises a plurality of translators respectively adapted to translate said estimator bits into positive polarity and negative polarity pulses or levels indicative of "1" and "0" estimator bits, a first arithmetic adder connected to receive said positive and negative polarity pulses or levels from said translators except for the translator of said certain one of the code bits and adapted to produce the arithmetic sum thereof, a threshold circuit connected to the output of said arithmetic adder and adapted to produce an output bit indicative of the majority of said estimator bits except for said certain one of the code bits, and a second arithmetic adder connected to receive the output of said first arithmetic adder and also the output of said translator for said certain one of the code bits, and in which said tie detector circuit comprises a null zone detector connected to receive the output of said second arithmetic adder and adapted to produce a switch control signal in the event that the output of said second arithmetic adder indicates less than a majority of said estimator bits, and means connecting said switch means to receive said switch control signal so as to be actuated thereby.

5. A circuit as claimed in claim 4, in which said switch means comprises a first AND circuit having an input connected to the output of said threshold circuit, an inverter circuit connected between the output of said null zone detector and another input of said first AND circuit, a second AND circuit having an input connected to said output of the null zone detector and having another input connected to receive said certain one of the data bits, and an OR circuit having inputs respectively connected to the outputs of said first and second AND circuits and an output connected to said decoder output terminal.

* * * * *